US011361070B1

(12) United States Patent
Rabinovich

(10) Patent No.: US 11,361,070 B1
(45) Date of Patent: Jun. 14, 2022

(54) PROTECTING DEVICES FROM REMOTE CODE EXECUTION ATTACKS

(71) Applicant: Ilya Rabinovich, Bat Yam (IL)

(72) Inventor: Ilya Rabinovich, Bat Yam (IL)

(*) Notice: Subject to any disclaimer, the term of this patent is extended or adjusted under 35 U.S.C. 154(b) by 121 days.

(21) Appl. No.: 17/034,177

(22) Filed: Sep. 28, 2020

Related U.S. Application Data

(60) Provisional application No. 62/943,128, filed on Dec. 3, 2019.

(51) Int. Cl.
*G06F 21/54* (2013.01)
*G06F 9/30* (2018.01)
*G06F 21/56* (2013.01)

(52) U.S. Cl.
CPC ............ *G06F 21/54* (2013.01); *G06F 9/3004* (2013.01); *G06F 21/566* (2013.01); *G06F 2221/033* (2013.01)

(58) Field of Classification Search
CPC ...... G06F 21/54; G06F 9/3004; G06F 21/566; G06F 2221/033
See application file for complete search history.

(56) References Cited

U.S. PATENT DOCUMENTS

| 8,925,090 | B2* | 12/2014 | Kc | G06F 21/566 |
| | | | | 726/2 |
| 2012/0159193 | A1* | 6/2012 | Spradlin | G06F 21/51 |
| | | | | 713/190 |
| 2015/0039864 | A1* | 2/2015 | Tobin | G06F 21/56 |
| | | | | 712/220 |

* cited by examiner

*Primary Examiner* — Paul E Callahan
(74) *Attorney, Agent, or Firm* — Bardmesser Law Group

(57) ABSTRACT

Method for secure execution of code, including (a) on a CPU, where opcodes for the same executable instructions differ from one memory page to another, depending on memory tag, loading original static instructions from executable module <0> into non-tagged executable memory pages; (b) beginning execution of original static instructions of process <0>; (c) invoking a CPU instruction to start process <i>, where i=1 initially, in process <0>, to create a new memory tag <i>, its set of randomized opcodes and to return memory tag <i> and new randomized set of opcodes to process <0>; (d) loading executable module <i> for process <i> in process <0>, and transforming executable code using new randomized opcodes from step (c); (e) in process <0>, allocating tagged memory with tag <i> to process <i>, loading memory with compiled executable code from step (d) into process <i>, and running compiled code from step (d).

20 Claims, 4 Drawing Sheets

PROTECTING DEVICES FROM REMOTE CODE EXECUTION ATTACKS

CROSS REFERENCE TO RELATED APPLICATIONS

The present application is a non-provisional of US Provisional Patent Application No. 62943128, filed on Dec. 3, 2019.

FIELD OF THE INVENTION

The present invention relates to protection of computing devices from attacks that rely on remote code execution. Also, the invention allows to protect software algorithms from being scrutinizing be the outside attackers.

BACKGROUND OF THE RELATED ART

It is almost impossible to write software without errors. These errors are often exploited by malicious actors who are looking for financial gain. According to every classification, the most dangerous exploits (vulnerabilities) are those, which allow for remote code execution on the target device. As a result, the device may be fully compromised, wherein malefactors gain full access to the information stored there and take control over its computing resources. The hacked devices can be used as part of a botnet for network-based attacks, or to provide access to a LAN, or to disrupt their operation.

This type of attack is considered the most dangerous in all the classifications, because it permits a malicious actor to obtain the fullest access to all computational and network resources of the device being attacked, including taking complete control over it. This is of particular concern with components of IoT, IIoT, or with autonomous devices on which human life depends, or devices on which the infrastructure depends. Also, exploding of this type of vulnerabilities often involves a type of code that propagates from device to device without human intervention, using so called network worms, which can propagate extremely fast.

Modern antimalware mechanisms are most effective against computer viruses, spyware and trojans (and similar), but are almost completely ineffective against attacks that use remote code execution on a target device.

Remote code execution is triggered by a specially designed data packet that exploits a weakness, such as buffer overflow, and which causes an interrupt or interruption of the code being executed in such a way that the execution context is changed from the code that is expected to be executed to malicious code designed by the attacker. This can happen because in modern processors, data and instructions are not separated from each other. Thus, to execute inserted malicious code, such as remote execution code, no separate programming modules are required—only a vulnerability in existing code.

Nowadays companies and individuals mainly rely on software updates, in which the developer corrects known errors. However, this protection model has the following drawbacks:

1. Before fixing a vulnerability, it has to be identified. Until the developer has learned about the error, it can't be fixed, and malicious actors can choose their attack targets freely.
2. Even after the developer has become aware of the error, they have to analyze its causes, program a fix, and test it. Then, they can release a fixed version. This process takes considerable time—days or even months, while malefactors are still able to choose their attack targets freely.
3. Not all updates can be installed, even if the developer releases them. For example, there is not enough space in the data storage for the update. Or, the device to be protected has no network connection, so someone has to update its software manually. (This is especially problematic with IoT—Internet of Things—devices).
4. Software products have limited lifecycles when they are supported by the developer, after which they will no longer be updated. For example, Windows 2000 has been off support for a long time. However, its core still has many vulnerabilities that can be used for remote code execution attacks, and there are still devices that work with this operating system.

In order to prevent remote code execution attacks, executable attributes for memory pages containing data are turned off, and various methods are used to randomize address spaces of processes, including locations of code, data, service and system areas. The latter allows to increase entropy in order to make it harder for a malefactor to locate an entry point for an attack. However, by using vulnerability chains that involve revealing or leaking of data and code locations within a process, the malefactor is able to exploit a given vulnerability.

Therefore, a solution is proposed to maximize the entropy in the executable memory pages of a process. To achieve that, it is necessary to tag executable memory pages with certain identifier and associate a particular randomized CPU opcode set with their memory tag. Therefore, in order to execute a malicious code sequence on the device under attack, the malefactor will have to not only to locate the addresses of areas containing executable memory and non-executable data (as they do, conventionally), but also to reconstruct a major part of a randomized set of CPU opcodes for a given set of tagged memory pages.

Also, some companies try to prevent competitors from scrutinizing their algorithms. Conventionally, analysis is hindered by encryption of executables and code obfuscation. However, the executable code of a program can be easily accessed, after it has been loaded into RAM. All necessary data can be physically frozen at the memory modules, then extracted from RAM and subsequently read. To bypass obfuscation, static and dynamic analysis are used, including weak-AI analysis.

SUMMARY OF THE INVENTION

Accordingly, in one aspect, there is provided a method for secure execution of computer code, including (a) on a CPU, wherein the CPU is configured to run executable code loaded into memory, such that opcodes for the same executable instructions differ from one memory page to another memory page, depending on its memory tag, loading original static instructions from executable module <0> into its non-tagged executable memory pages; (b) beginning execution of the original static instructions of the process <0>; (c) invoking a "randomize opcode table" CPU instruction to start a process <i>, where i=1 initially, in the process <0>, so as to create a new memory tag <i>, its set of randomized opcodes and to return the memory tag <i> and the new randomized set of opcodes to the process <0>; (d) loading an executable module <i> for the process <i> in the process <0>, wherein the executable module <i> includes a data packet from a network, a file or static set of files that contains an executable code, data and metadata, and translating or compiling the executable code using the new randomized set of opcodes from step (c); (e) in the process <0>, allocating tagged executable memory with the tag <i> to the process <i>, loading the memory with the compiled executable code from step (d) into the process <i>, and running the compiled executable code from step (d); and (f) incrementing <i> and repeating steps (b)-(e) for the next process.

Optionally, the process <0> translates or compiles the executable code of the module <i> in accordance with the randomized set of opcodes. Optionally, the process <i> has tagged memory pages that contain executable code, generated based on the randomized set of opcodes that are transformed by the CPU into internal fixed CPU instructions during execution. Optionally, the process <0> generates one memory tag and randomized opcodes set per each module that is loaded into the process <i>.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

In order to protect algorithms from being scrutinized, it is enough to enhance the CPU with two data locations—a protected memory and cryptographic key storage. Then, the encrypted module or a part thereof is loaded from the data storage into the protected memory. The data are decrypted in the protected memory, using cryptographic keys. Finally, the executable (or intermediate) code of the module is transformed in accordance with the randomized CPU opcode set, before being loaded into conventional memory.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
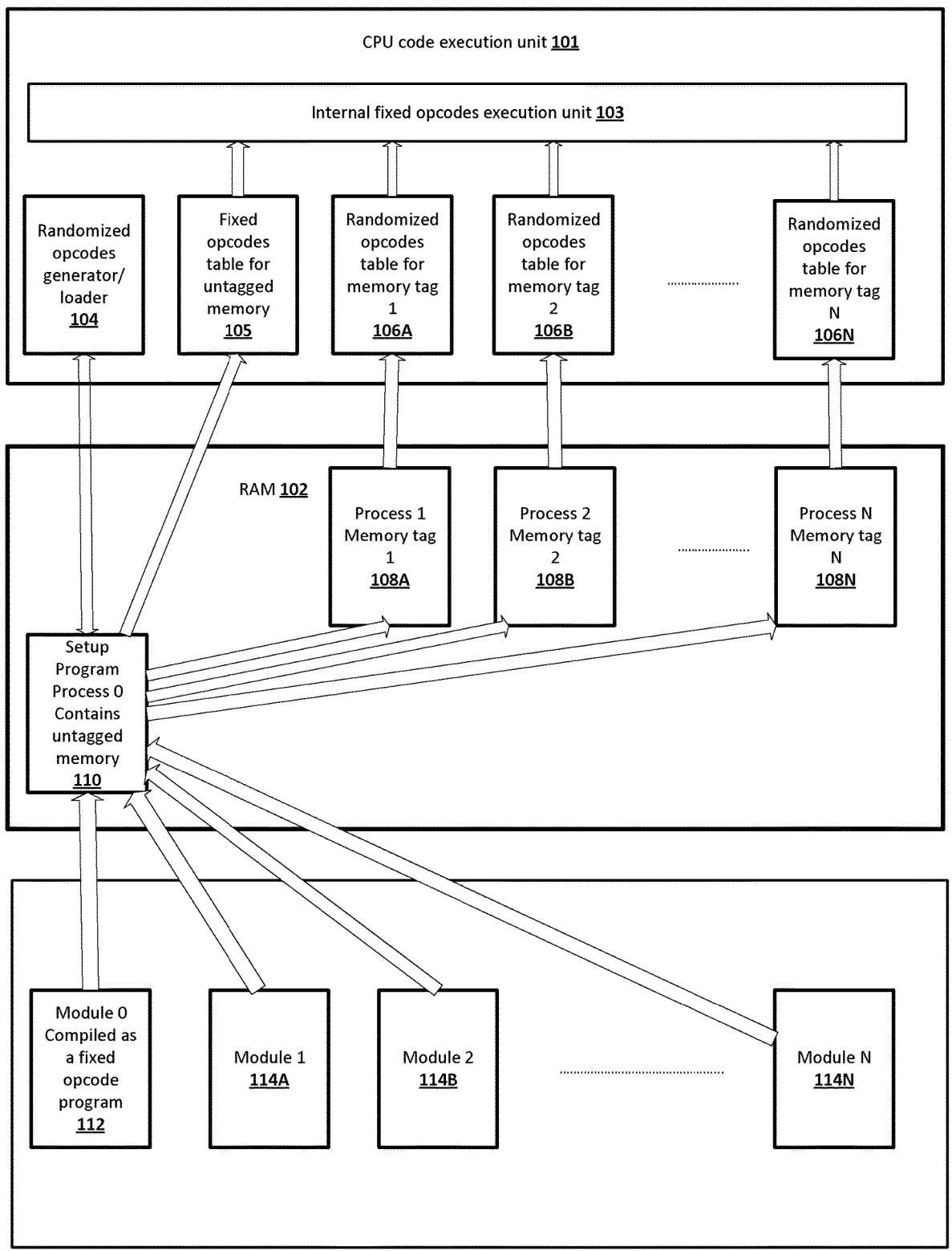
FIG. 1 illustrates the hardware level concept of per-memory random opcodes processing.

Reference will now be made in detail to the preferred embodiments of the present invention, examples of which are illustrated in the accompanying drawings.

The proposed method for protecting algorithms from scrutinizing is based on the fact, that each process run on the computer appliance has its own randomized set of CPU opcodes. Therefore, malefactors trying to scrutinize algorithms will have not only to dump data from frozen memory modules, but also to try and reconstruct major parts of CPU opcode sets for each set of tagged memory pages of certain process, if not entire sets.

In order to protect algorithms from being scrutinized, it is enough to enhance the CPU with two data locations—a protected memory and cryptographic key storage. Then, the encrypted module or a part thereof is loaded from the data storage into the protected memory. The data are decrypted in the protected memory, using cryptographic keys. Finally, the executable (or intermediate) code of the module is transformed in accordance with the randomized CPU opcode set, before being loaded into conventional memory.

It is possible to implement the protected CPU as an external secured co-processor that executes software modules safe way. In this case main CPU that have regular architecture sends code blocks that need to be executed secure and protected way, to the co-processor. Co-processor takes the code block and decrypt it, if they are encrypted. After that the co-processor runs those code blocks secure way and loads into the memory, shared between CPU and co-processor, for secure execution. All the data that represent the results of the execution, co-processor sends back to the main CPU module.

The proposed approach is implemented on a specially designed CPU that creates unique CPU opcode sets for each set of tagged memory pages executed by the CPU, except the ones that belongs to the initial process and, thus, are not tagged. Therefore, the same CPU instructions for differently set of tagged memory pages will be encoded randomly. The tables of the randomly generated opcodes are stored within the CPU, and are used for each process (except the initial one), and are therefore inaccessible from the outside. The CPU translates the executable code of the program by using the table of randomly generated opcodes into a fixed set of instructions that are internally valid, which are then executed.

Also, certain measures are required to counter statistical attacks against the process' opcode sets, i.e., each instruction may be encoded using several different randomly generated unique codes. In addition, CPU instruction length variations may be introduced, as well as zero point shifts (i.e., "0" may be encoded as "3", "5" as "9", etc.) for both data and instructions' codes, encrypted function and data pointers. At the same time, the initial process will still use the standard fixed set of CPU opcodes.

| INSTRUCTION | FIXED OPCODE | PROCESS 1 RANDOMIZED OPCODE | PROCESS 2 RANDOMIZED OPCODE |
|---|---|---|---|
| MOV | B8 | 1F | 3B, FE, 14 |
| ADD | A1 | 24 | 01 |
| SUB | C8 | 64, 79 | 55, 32 |
| ADD | D2 | 03 | 06 |
| NOT | 12 | A1 | F2 |
| XOR | 07 | F1, F7 | A6, 01, 03 |
| JUMP | E8 | A8 | B1, 09, 11, 74 |

For each new process in the system, a new opcode table is generated, based on which the modules that are loaded for execution are either translated or compiled. There are three options:

1. The translation/compilation process (process 0) creates a new random opcode table and memory tag that is associated with this table, translates or compiles the modules that the new tagged memory pages being loaded into the new process requires, loads them into the memory of the new process under corresponding memory tags, and gives the CPU a new table(s) of opcodes, associating it with new tags of memory pages being allocated to the new process. The new process is launched by process 0.

2. Translation/compilation process 0 asks the CPU to generate a new table(s) of random opcodes, and then gives the CPU all or part of the code that needs to be loaded for the new process's memory pages. The CPU performs the translation or compilation of these modules based on the new table(s), and then gives the memory pages and its tags back to process 0, which can then start a new process based on their received code. Process 0 creates the new process, loads the translated/compiled tagged memory pages that it receives from the CPU, and links the memory tags to the new process's memory pages. The new process is then launched by Process 0.

3. Translation/compilation process 0 asks the CPU to generate a new table(s) of random opcodes. Once it receives the table from the CPU, it translates or compiles the modules being loaded for the new process. Then process 0 then creates new memory tag(s), allocates memory pages with tag(s) into the memory space of the new process, fills those memory pages with the translated or compiled data, associates the new table(s) with the memory pages tags(s) of the new process into the CPU. Process 0 then launches the new process.

4. It is possible that one memory tag can be used for all the modules being loaded into the newly created process, or there can be a separate memory tag per each module loaded into the newly created process.

Also, the operation of such CPU requires software with a specially designed architecture. Therefore, a computer appliance is proposed.

The proposed CPU (unlike conventional CPUs) can identify the current tag of the memory page, on which code that is running now and execute it according to its unique randomized opcode table that CPU have in its internal memory structures.

The proposed CR_NEW_RND instruction (which current processors do not have) looks as following: process calls the CR_NEW_RND instruction and it returns new memory tag and memory size required. The CPU creates that information internally in response to the CR_NEW_RND instruction. After that process allocates memory of the required size and calls the CR_NEW_RND instruction one time with three parameters: memory tag, buffer memory address and buffer memory size. The instruction fills out the memory with the randomized opcode table data.

The proposed LD_RND_OPCODES instruction has three parameters, i.e., memory tag, address of the randomized opcodes table and its size. The instructions fills out internal data structures of the CPU with that data.

The proposed CR_NEW_RND2 command instruction has no parameters and returns only a new memory tag.

The proposed TRNSLT_INST command has five parameters: memory tag, pointer to an input buffer where initial static instructions lies on, size of the input buffer, pointer to an output buffer where CPU puts the result of the translation, pointer or register where CPU puts total size of the random opcodes buffer size resulted. TRNSLT_INST may be used to translate one static instruction into randomized one or a set of static instructions into the randomized ones.

The proposed CR_RND_TBL instruction gets one parameter: the memory tag. It returns the required memory size. After that, the process allocates the required memory and invoke the CR_RND_TBL instruction one more time with three parameters: memory tag, output memory buffer and the memory buffer size. The instruction returns randomized opcodes table into the memory buffer.

The proposed CR_RND_TBL2 instruction gets one parameter: the memory tag. Then the CPU creates a new randomized opcodes table and links it with the provided memory tag ID.

A new empty process refers to data structures that describe a new process where no memory or only system memory fields are allocated.

Consider any OS, e.g., MICROSOFT WINDOWS. A process is essentially a data structure or a set of data structures, which describe the memory and objects of the kernel that belong to the process. In other words, the process "owns" some memory and object descriptors for those objects that belong to the process. A thread is the execution of the instructions of a process by the CPU. In the present case, there is an additional object—a table of randomized opcodes for the instructions to be executed, which are located in the process' memory. Thus, what is needed is to:

1. Generate the table(s).
2. Create a process that has no memory allocated to it and no handles of the kernel objects.
3. Allocate new tagged memory pages into the process and logically link the tag(s) and its table(s) in the CPU, one-to-one (one tag—one randomized opcodes table).
4. Translate or compile fixed instructions of the module into a sequence of randomized instructions for the process according memory tags.
5. Load the translated sequence of randomized opcodes into that tagged memory.
6. Launch the process, creating a thread of executing the translated sequence.

Note that both process 0 and any processes it spawns can spawn new processes.

Note that non-tagged executable pages can be allocated only to the Process 0.

When the CPU is started, translation/compilation software is loaded into the non-tagged memory pages, becoming an initial process in the CPU layer (Process 0), which has a fixed set of opcodes. After launching, the translation/compilation software loads each consecutive program into a new layer, where CPU opcode sets are randomized. When a new process is created, as it is impossible to predict what a new opcode set will look like, the translation/compilation software uses a unique set of CPU opcodes. It then translates or compiles the executable for a new process's tagged memory pages on the fly, using the unique CPU opcodes set(s). Older executable codes are replaced with new ones, or a predetermined byte code of a certain virtual machine is compiled (e.g., Java byte code or DotNet byte code). Then, the newly translated/compiled program is loaded into the new process's tagged memory pages and launched.

In this way, executable codes are made completely unique in each iteration, which allows to guarantee an extremely high entropy for each executable process. Therefore, a hacker would need to receive information not only about the memory structure of the target process, but also about the CPU opcode set. A single mistake may render the malicious code, which has been loaded into the process, unable to start and work properly, thus resulting in a runtime error. Thus, remote code execution is prevented and the target process is relaunched. In addition, the code at the process's tagged memory pages is recompiled using a new set of CPU opcodes, thus making the hacker to start from scratch, without improving their chances for a successful attack.

Protected Loading and Launching Programs with Encrypted Bodies

This method is required, when it is necessary to prevent outside attackers from scrutinizing certain algorithms. Conventionally, the program executable is encrypted in the permanent storage, but it is also necessary to protect the algorithm after the program has been loaded into memory and decrypted there.

The present method is based on the computer appliance described above that translates and/or compiles the program body from the byte codes using a randomized set of CPU opcodes, which allows to protect the algorithm from being scrutinized. However, there is a vulnerability in the translation/compilation software, which loads the original file into memory and then decrypts it. To counter this vulnerability, the appliance is enhanced with a special memory unit that is integrated into the CPU. Thus, the translation/compilation software loads a part of the encrypted program into the special memory unit and decrypts it there, after which the decrypted code of the program is translated or compiled into conventional memory.

Note that this is dependent on the CPU, wherein opcode tables are modified for each process that has been loaded into the CPU.

FIG. 1 shows a CPU 101 that has its own fixed set of opcodes that cannot be accessed by programs. When the CPU starts, Module 0 (112) is loaded into it, creating Process 0 (110) that is executed using the fixed set of CPU opcodes. Then, Process 0 (110) spawns other processes, such as Process 1 (108A), Process 2 (108B), . . . , Process N (108N), which will receive randomized sets of CPU opcodes. These processes' tagged memory pages Memory Tag 1 (108A), Memory Tag 2 (108B), . . . , Memory Tag N (108N) are loaded from Module 1, Module 2, . . . , Module N, correspondingly, from connected data storages, before their executable codes are modified by Process 0 in accordance with the randomized set of opcodes (105), which has been received from the CPU. Also, when the randomized set of opcodes from the process is executed on the CPU, the CPU transforms these instructions into internal fixed CPU instructions using the randomized set of opcodes, which is associated with the corresponding process' tags of memory pages.

Figure 2:
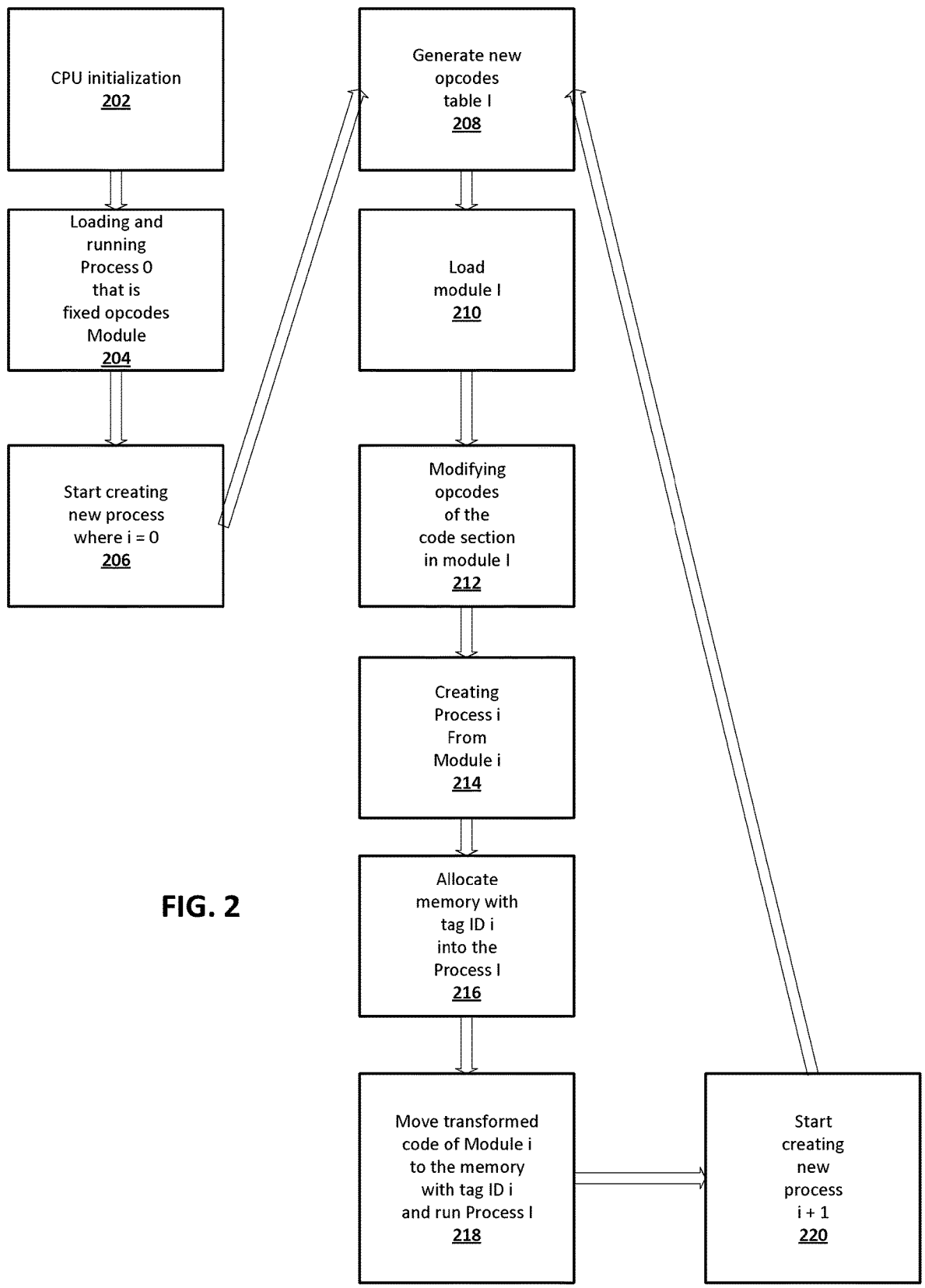
FIG. 2 illustrates the software execution flow at the per-process level.

FIG. 2 shows the software execution flow at the per-process level. In FIG. 2:
1. The CPU is started (step 202).
2. Process 0 is loaded into the CPU and executed using its fixed set of instructions (step 204).
3. When a new process is started (step 206), Process 0 executes a specialized CPU command (step 208)(which conventional processors do not have such a command in their instruction sets) and receives a new randomized set of opcodes i and new memory pages tag that corresponds to the set of opcodes.
4. Process 0 loads (step 210) the new executable Module i into its address space.
5. Process 0 translates or compiles (step 212) the executable code of the Module i in accordance with the randomized set of opcodes that have been received from the CPU.
6. When executed by the CPU, Process 0 creates new Process i (step 214), allocates new memory pages to the Process i (step 216) that corresponds with the memory pages tag i and loads transformed or compiled code (step 218) of the Module i into them. Process i having a randomized set of opcodes on its code-related memory pages that are transformed inside the CPU into internal fixed CPU instructions on execution according to its memory tag.
7. When a new process is started, the i variable increments by 1, and the algorithm above is repeated starting from step 3 (step 220).

Figure 3:
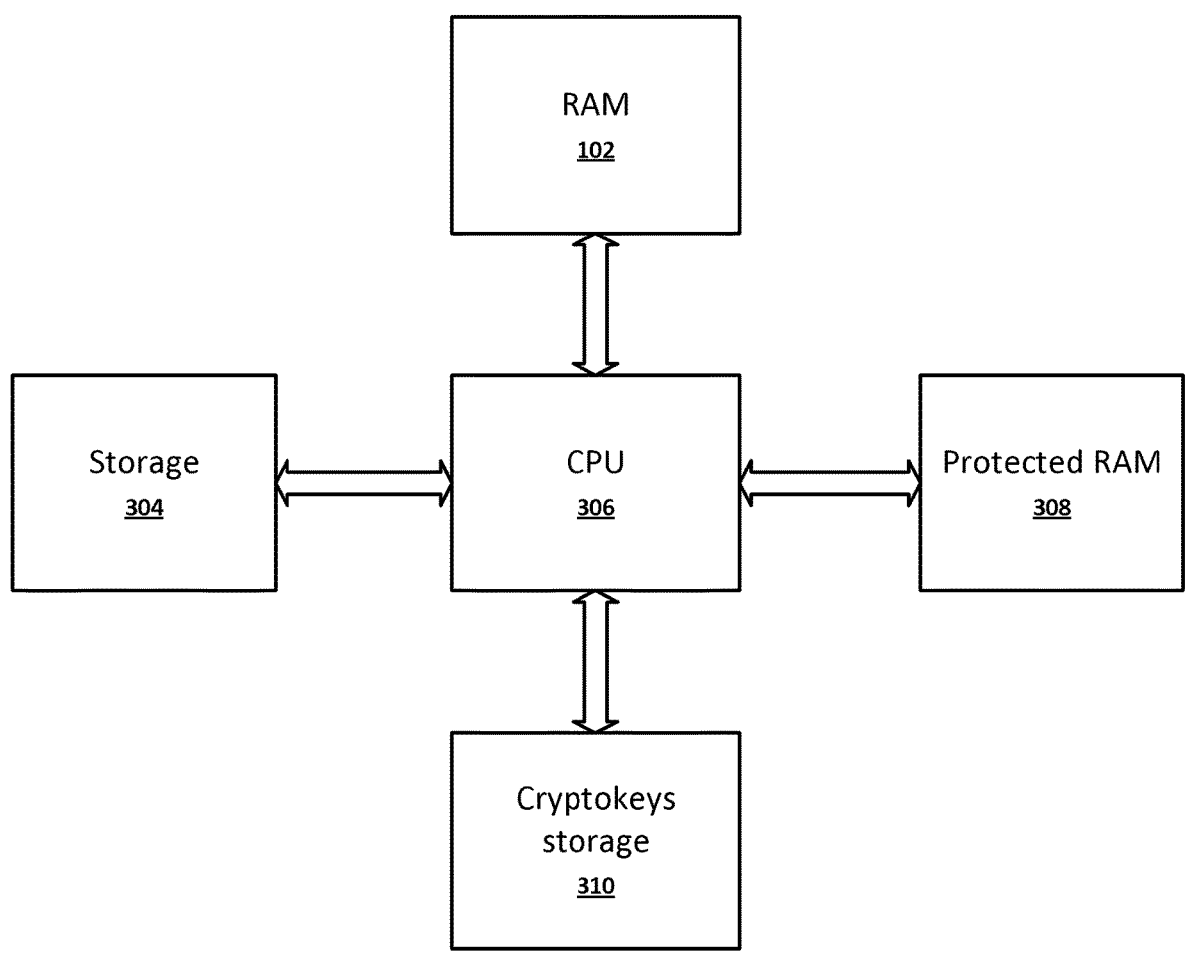
FIG. 3 illustrates optional additions to the CPU that allow to protect algorithms from being hijacked.

FIG. 3 shows optional additions to the CPU (306) that allow to protect algorithms from being hijacked. When the vendor wants to protect their algorithm from reverse engineering, the CPU is enhanced with protected memory (308), i.e., memory from which it is impossible to extract information, and a storage (304) that is protected from forced information extraction with cryptographic keys (310).

In this case, FIGS. 1 and 2 are left unchanged, but Process 0 (step 208), after receiving the randomized set of opcodes i, loads the Module i (step 210) into the protected memory (308), instead of conventional RAM, wherein the Module i is encrypted. Thus, after the Module i, or a part thereof, has been loaded, the CPU decrypts its data using an irretrievable cryptographic key or keys (310), that are stored in the designated cryptographic storage (304). After that, process 0 starts to translate or compile the decrypted data from the module i (step 212), or a part thereof, in accordance with the randomized set of opcodes i, thus creating a new process i (step 214), a ram image of the process i with the memory pages tag i (step 216) that corresponds with the randomized set of opcodes i, and then moving module i (step 218) to the allocated memory pages with tag i. After the image of the code and data has been created in the address space of the Process i, it is executed (step 220).

Figure 4:
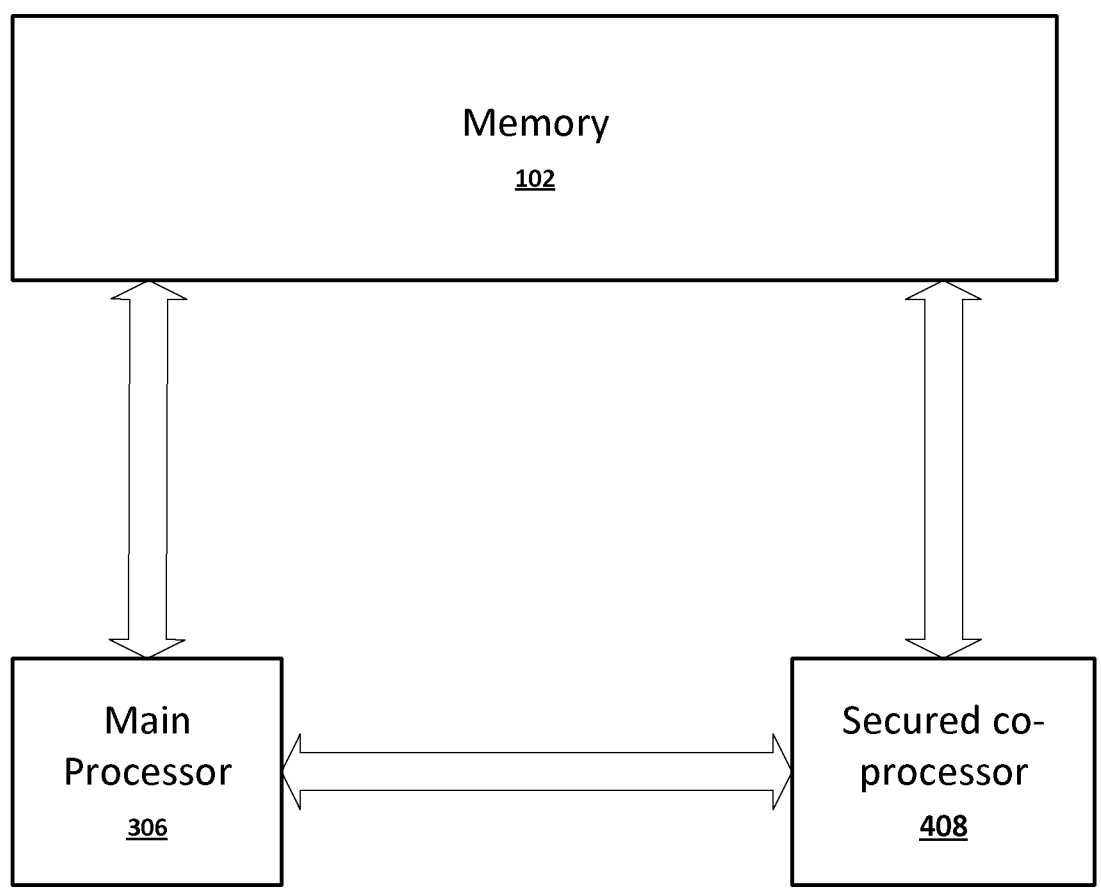
FIG. 4 shows an implementation of the protected CPU as an external secure co-processor that executes software modules in a safe manner.

It is possible to implement the protected CPU as an external secure co-processor that executes software modules in a safe manner (see FIG. 4). In this case the main CPU that has a standard architecture (e.g., Intel x86) (306) that sends code blocks that need to be executed in a secure and protected way, to the co-processor (408). The co-processor takes the code block and decrypt it, if they are encrypted, as described above. After that the co-processor runs those code blocks secure way as described above, and loads into the memory, shared between CPU and co-processor, (102) for secure execution. All the data that represent the results of the execution, co-processor sends back to the main CPU module (such as via a data bus).

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:

1. A method for secure execution of computer code, comprising:
   (a) on a CPU, wherein the CPU is configured to run executable code loaded into memory, such that opcodes for the same executable instructions differ from one memory page to another memory page, depending on its memory tag, loading original static instructions from executable module <0> into its non-tagged executable memory pages;
   (b) beginning execution of the original static instructions of the process <0>;
   (c) invoking a "randomize opcode table" CPU instruction to start a process <i>, where i=1 initially, in the process <0>, so as to create a new memory tag <i>, its set of randomized opcodes and to return the memory tag <i> and the new randomized set of opcodes to the process <0>;

(d) loading an executable module <i> for the process <i> in the process <0>, wherein the executable module <i> includes a data packet from a network, a file or static set of files that contains an executable code, data and metadata, and translating or compiling the executable code using the new randomized set of opcodes from step (c);

(e) in the process <0>, allocating tagged executable memory with the tag <i> to the process <i>, loading the memory with the compiled executable code from step (d) into the process <i>, and running the compiled executable code from step (d); and (f) incrementing <i> and repeating steps (b)-(e) for the next process.

2. The method of claim 1, wherein the process <0> translates or compiles the executable code of the module <i> in accordance with the randomized set of opcodes.

3. The method of claim 1, wherein the process <i> has tagged memory pages that contain executable code, generated based on the randomized set of opcodes that are transformed by the CPU into internal fixed CPU instructions during execution.

4. The method of claim 1, wherein the process <0> generates one memory tag and randomized opcodes set per each module that is loaded into the process <i>.

5. A method for secure execution of computer code, comprising:
(a) on a CPU, wherein the CPU is configured to run executable code loaded into memory, such that opcodes for the same executable instructions differ from one memory page to another memory page, depending on its memory tag, loading original static instructions from executable module <0> into its non-tagged executable memory pages;

(b) beginning execution of the original static instructions of the process <0>;

(c) spawning, from the process <0>, a new empty process <i> with a memory tag <i> and new randomized set of opcodes, where the randomized set of opcodes are linked to memory pages of the empty process <i> through the memory tag <i>, and where i=1 initially;

(d) in the process <0>, invoking a CPU instruction to load both the memory tag <i> and the corresponding randomized set of opcodes into the CPU;

(e) in the process <0>, loading an executable module <i> for the process <i>, wherein the executable module <i> includes a data packet from a network, a file or static set of files that contains an executable code, data and metadata, and translating or compiling the executable code using the new randomized set of opcodes from step (c);

(f) in the process <0>, allocating tagged executable memory pages with the tag <i> to the process <i>, loading the tagged executable memory pages with the compiled executable code from step (e) into the process <i>, and running the compiled executable code from step (e); and (g) incrementing <i> and repeating steps (c)-(f) for the next process.

6. The method of claim 5, wherein the process <0> translates or compiles the executable code of the module <i> in accordance with the randomized set of opcodes.

7. The method of claim 5, wherein the process <i> has tagged memory pages that contain executable code, generated based on the randomized set of opcodes that are transformed by the CPU into internal fixed CPU instructions during execution.

8. The method of claim 5, wherein the process <0> generates one memory tag and randomized opcodes set per each module got loaded into the process <i>.

9. A method for secure execution of computer code, comprising:
(a) on a CPU, wherein the CPU is configured to run executable code loaded into memory, such that opcodes for the same executable instructions differ from one memory page to another memory page, depending on its tag ID, loading original static instructions from executable module <0> into its non-tagged executable memory pages;

(b) beginning execution of the original static instructions of the process <0>;

(c) invoking a "randomize opcode table" CPU instruction to start a process <i>, where i=1 initially, in the process <0>, so as to create a new memory tag <i>, its set of randomized opcodes and to return the memory tag <i> to the process <0>;

(d) loading an executable module <i> for the process <i> in the process <0>, wherein the executable module <i> includes a data packet from a network, a file or static set of files that contains an executable code, data and metadata, and translating or compiling the executable code by invoking a CPU instruction that loads an initial code sequence and a memory tag <i> into the CPU and compiles or translates the initial code sequence according the randomized opcodes table that corresponds to the memory tag <i> that the process <0> received in step (c);

(e) in the process <0>, allocating tagged executable memory with the tag <i> to the process <i>, loading the memory with the compiled executable code from step (d) into the process <i>, and running the compiled executable code from step (d); and (f) incrementing <i> and repeating steps (b)-(e) for the next process.

10. The method of claim 9, wherein the process <0> translates or compiles the executable code of the Module i in accordance with the randomized set of opcodes.

11. The method of claim 9, wherein the process <i> has tagged memory pages that contain executable code, generated based on the randomized set of opcodes that are transformed by the CPU into internal fixed CPU instructions during execution.

12. The method of claim 9, wherein the process <0> generates one memory tag and randomized opcodes set per each module that was loaded into the process <i>.

13. A method for secure execution of computer code, comprising:
(a) on a CPU, wherein the CPU is configured to run executable code loaded into memory, such that opcodes for the same executable instructions differ from one memory page to another memory page, depending on its memory tag, loading original static instructions from executable module <0> into its non-tagged executable memory pages;

(b) beginning execution of the original static instructions of the process <0>;

(c) to start a process <i>, where i=1 initially, the process <0> creates a new executable memory tag <i> and then invokes a "randomize opcode table" CPU instruction to create a new set of randomized opcodes that is associated with the memory tag <i> in the CPU and returning the new set of randomized set opcodes to the process <0>;

(d) loading an executable module <i> for the process <i> in the process <0>, wherein the executable module <i> includes a data packet from a network, a file or static set of files that contains an executable code, data and metadata, and translating or compiling the executable code using the new randomized set of opcodes from step (c);

(e) in the process <0>, allocating tagged executable memory with the tag <i> to the process <i>, loading the memory with the compiled executable code from step (d) into the process <i>, and running the compiled executable code from step (d); and (f) incrementing <i> and repeating steps (b)-(e) for the next process.

14. The method of claim 13, wherein the process <0> translates or compiles the executable code of the module <i> in accordance with the randomized set of opcodes.

15. The method of claim 13, wherein the process <i> has tagged memory pages that contain executable code, generated based on the randomized set of opcodes that are transformed by the CPU into internal fixed CPU instructions during execution.

16. The method of claim 13, where Process <0> generates one memory tag and randomized opcodes set per each module got loaded into the Process <i> in case there are few of them.

17. A method for secure execution of computer code, comprising:

(a) on a CPU, wherein the CPU is configured to run executable code loaded into memory, such that opcodes for the same executable instructions differ from one memory page to another memory page, depending on its tag ID, loading original static instructions from executable module <0> into its non-tagged executable memory pages;

(b) beginning execution of the original static instructions of the process <0>;

(c) to start a process <i>, where i=1 initially, the process <0> creates a new executable memory pages tag <i> and then invokes a "randomize opcode table" CPU instruction to create a new set of randomized opcodes that is associated with the memory tag <i> in the CPU;

(d) loading an executable module <i> for the process <i> in the process <0>, wherein the executable module <i> includes a data packet from a network, a file or static set of files that contains an executable code, data and metadata, and translating or compiling the executable code by invoking a CPU instruction that sends initial code sequence and memory tag <i> into the CPU and compiles or translates back according the randomized opcodes table that corresponds with the memory tag <i> that the process <0> received at the step (c);

(e) in the process <0>, allocating tagged executable memory with the tag <i> to the process <i>, loading the memory with the compiled executable code from step (d) into the process <i>, and running the compiled executable code from step (d); and (f) incrementing <i> and repeating steps (b)-(e) for the next process.

18. The method of claim 17, wherein the process <0> translates or compiles the executable code of the module <i> in accordance with the randomized set of opcodes.

19. The method of claim 17, wherein the process <i> has tagged memory pages that contain executable code, generated based on the randomized set of opcodes that are transformed by the CPU into internal fixed CPU instructions during execution.

20. The method of claim 17, wherein the process <0> generates one memory tag and randomized opcodes set per each module that were loaded into the process <i>.

\* \* \* \* \*